Nov. 12, 1957 — A. A. LOBANOFF — 2,812,558
WINDSHIELD MOUNTING CHANNEL
Filed Nov. 16, 1953
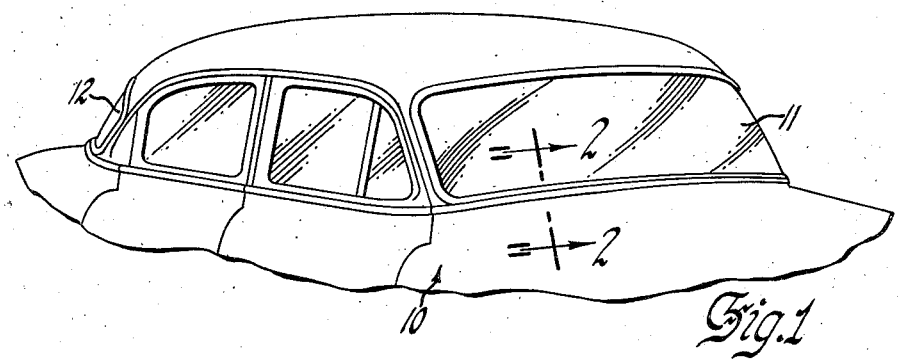
Fig. 1
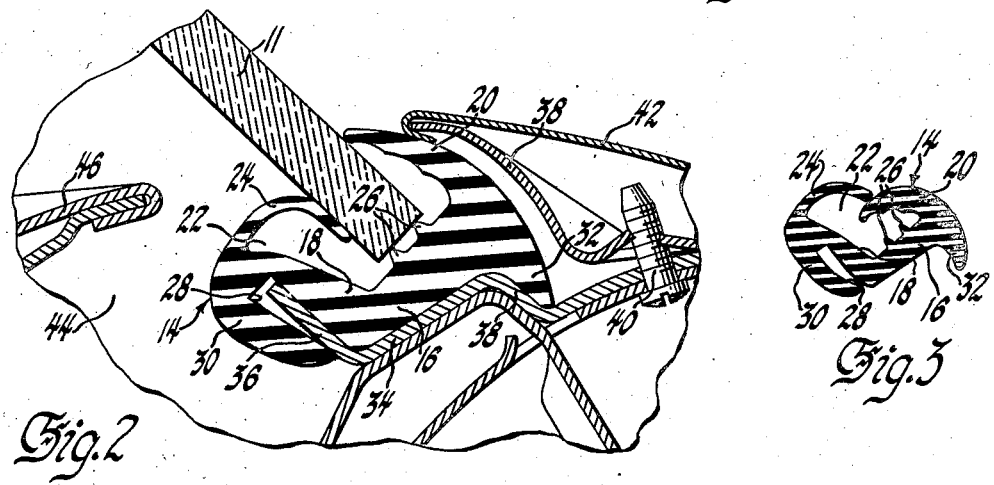
Fig. 2   Fig. 3
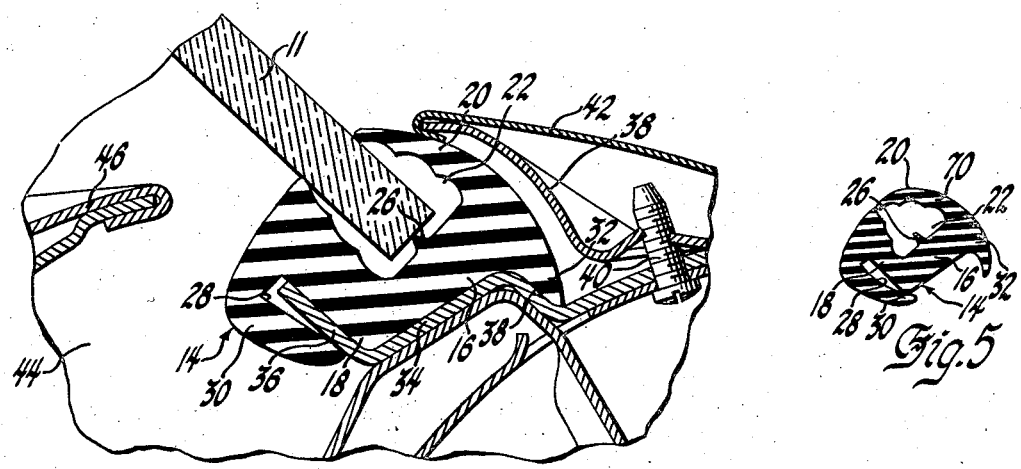
Fig. 4   Fig. 5
INVENTOR
Arkady A. Lobanoff
BY
ATTORNEY United States Patent Office 2,812,558
Patented Nov. 12, 1957

2,812,558
WINDSHIELD MOUNTING CHANNEL

Arkady A. Lobanoff, Detroit, Mich., assignor to General Motors Corporation, Detroit, Mich., a corporation of Delaware Application November 16, 1953, Serial No. 392,143

3 Claims. (Cl. 20—56.4)

This invention relates to a mounting strip for windows, and more particularly to a flexible mounting strip for the windshield or rear window of an automobile.

Automobile windshields and rear windows may be curved both longitudinally and vertically, and because of this compound curvature, it is difficult to hold the window to an exact shape. The invention provides an improved flexible mounting strip for windows in which the window "floats" in the sense that the mounting strip will hold the window and will seal against the outer and inner surfaces of the window despite variations from a standard in the exact shape of the window, and particularly if the location of the edge of the glass varies from the standard in directions transverse to the plane of the glass adjacent its edge.

One feature of the invention is that it provides an improved mounting strip for windows; another feature of the invention is that it provides a mounting strip having a channel for seating the edge of the window glass, the channel being wider than the thickness of the window glass; a further feature of the invention is that the channel is formed by a base portion and spaced flexible lips which seal against the inner and outer surfaces of the window; yet another feature of the invention is that the lips converge at their free edges to provide a seal against the window glass; and still another feature of the invention is that the lips overlap at their free edges when unstressed.

Other features and advantages of the invention will be apparent from the following description and from the drawings, in which:

Fig. 1 is a fragmentary front perspective view of an automobile embodying the novel mounting strip;

Fig. 2 is an enlarged transverse section through a portion of the windshield and its mounting strip, taken along the line 2—2 of Fig. 1;

Fig. 3 is a reduced transverse section through the mounting strip of Fig. 2 removed from the car and in unstressed condition;

Fig. 4 is a section similar to Fig. 2, but showing a modified form of mounting strip; and Fig. 5 is a reduced transverse section through the mounting strip of Fig. 4 removed from the car and in unstressed condition.

Referring now more particularly to the drawings, an automobile body is designated generally at 10, the windshield being indicated at 11 and the rear window at 12. The windshield 11 is curved both longitudinally and vertically, and the rear window 12 is of similar conformation. The windshield is carried in a flexible mounting strip 14 which generally is formed of rubber and which preferably extends in a single integral strip all the way around the periphery of the windshield. The rear window 12 may be carried in a similar mounting strip.

Referring to Figs. 2 and 3, the mounting strip comprises a base portion or web 16 having spaced inner and outer lips 18 and 20 extending at an angle therefrom, the base and lips forming a channel 22 wider than the thickness of the window glass 11 for seating the edge of the glass. The lips converge at their free edges, and the inner lip 18 has a flange 24 projecting from its free edge into the channel 22, the flange and the lip 20 overlapping when the strip is unstressed, as shown in Fig. 3. When the windshield 11 is seated in the channel, the outside lip 20 is stressed outwardly to form a seal against the glass, and the flange 24 of inner lip 18 is bent down and lies against the inside surface of the glass, as shown in Fig. 2. Preferably, the base 16 is formed with one or more ridges 26 upon which the edge of the glass rests.

Since the channel 22 is wider than the thickness of the glass 11, the glass may seat in the channel even if the glass varies from a standard shape, such variations being rather common in windshields and rear windows of compound curved formation, and even if the metal frame which holds the strip 14 varies from a standard shape. Since the lips converge and are spaced at their free edges a distance less than the thickness of the glass 11, a good seal is provided despite such variations in the shape of the glass and frame, and the overlapping flange 24 and lip 20 insure adequate sealing pressure because of the stress introduced in these resilient members when they are forced apart by the glass.

A slot 28 is formed in the weatherstrip by a mounting portion 30 which projects from the inside lip 18 and which extends back toward the base 16, the slot 28 lying between the portion 30 and the lip 18 and providing mounting means for the strip. On the opposite side of the channel 22 from the slot 28 a supporting flange 32 projects from the base 16 and extends away from the channel 22. When the strip 14 is mounted on the automobile body, the base 16 seats on a body support member 34, this member having a flange 36, known in the trade as the "pinch weld flange," which lies in the slot 28. The member 34 also is formed with an angularly extending or offset portion 38 which abuts the supporting flange 32. The weatherstrip is clamped in place by an outside retainer 38 which is mounted on the member 34 by screws, one of which is shown at 40, and a decorative trim strip 42 is clipped to the retainer 38, the edge of the trim strip abutting the lip 20 and forcing the free edge of the lip against the outer surface of the windshield 11.

On the inside of the car at the point where the section shown in Fig. 2 is taken, a defroster slot 44 is formed between the edge of the dash panel 46 and the windshield 11. At other locations around the periphery of the windshield the construction may be similar to the construction shown on the outside of the windshield, a decorative trim strip engaging the surface of the flexible mounting strip.

In Fig. 4, a modification of the improved weatherstrip is shown wherein the flange 24 is omitted. In this modification, the free end of lip 18 engages the inner surface of the glass. In this form of the invention, the free edges of lips 18 and 20 converge and, when unstressed, are spaced apart a distance less than the thickness of the window glass, preferably overlapping as shown in Fig. 5.

While I have shown and described two embodiments of my invention, it is capable of many modifications. Changes, therefore, in the construction and arrangement may be made without departing from the spirit and scope of the invention as set forth in the appended claims.

I claim:

1. Mounting means for windows, comprising: a flexible mounting strip having a base portion and spaced lips extending therefrom, said base and lips forming a channel wider than the thickness of the window glass for seating the edge of said glass and said lips converging at their free edges, a flange projecting into said channel from the free edge of one lip and overlapping the other lip when unstressed, and said strip having a mounting portion projecting from one of the lips and extending back toward said base to form a mounting slot; and a mounting member having a portion extending into said slot, said portion being of less width than said slot so that at least one of the lips and said flange are freely flexible to compensate for variations in the shape of the window.

2. Mounting means for windows, comprising: a flexible mounting strip having a base portion and spaced lips extending therefrom, said base and lips forming a channel wider than the thickness of the window glass for seating the edge of said glass and said lips converging at their free edges, a flexible flange projecting into said channel from the free edge of one lip and overlapping the other lip when unstressed, and said strip having a mounting portion projecting from one of the lips and extending back toward said base to form a mounting slot between said mounting portion and the lip from which it projects, and said strip having a supporting flange projecting from the base on the opposite side of said channel from said slot and extending away from said channel; and a mounting member having a portion extending into said mounting slot, said portion being of less width than said slot so that at least one of the lips and said flange are freely flexible to compensate for variations in the shape of the window.

3. Apparatus of the character claimed in claim 2, wherein said supporting flange projects from said base portion opposite the lip other than the lip from which said flexible flange projects, and wherein said mounting portion projects from the lip which carries said flexible flange.

References Cited in the file of this patent

UNITED STATES PATENTS

| | | |
|---|---|---|
| 2,233,335 | Axe et al. | Feb. 25, 1941 |
| 2,569,955 | Schassberger | Oct. 2, 1951 |
| 2,606,635 | Clingman | Aug. 12, 1952 |

FOREIGN PATENTS

| | | |
|---|---|---|
| 476,164 | Canada | Aug. 14, 1951 |
| 71,156 | Netherlands | Nov. 15, 1952 |